(12) United States Patent
Khelifa et al.

(10) Patent No.: US 9,421,845 B2
(45) Date of Patent: Aug. 23, 2016

(54) HEATING AND AIR-CONDITIONING SYSTEM FOR A MOTOR VEHICLE

(75) Inventors: Noureddine Khelifa, Munich (DE); Wolfgang Kraemer, Munich (DE)

(73) Assignee: WEBASTO AG, Stockdorf (DE)

( * ) Notice: Subject to any disclaimer, the term of this patent is extended or adjusted under 35 U.S.C. 154(b) by 1577 days.

(21) Appl. No.: 10/571,698

(22) PCT Filed: Apr. 15, 2005

(86) PCT No.: PCT/EP2005/003973
§ 371 (c)(1),
(2), (4) Date: Nov. 29, 2006

(87) PCT Pub. No.: WO2005/102746
PCT Pub. Date: Nov. 3, 2005

(65) Prior Publication Data
US 2007/0083295 A1     Apr. 12, 2007

(30) Foreign Application Priority Data
Apr. 22, 2004   (DE) .......................... 10 2004 019 607

(51) Int. Cl.
*B60H 1/32* (2006.01)
*B60H 1/00* (2006.01)
*B60H 1/03* (2006.01)

(52) U.S. Cl.
CPC ............ *B60H 1/00064* (2013.01); *B60H 1/005* (2013.01); *B60H 1/00207* (2013.01);
(Continued)

(58) Field of Classification Search
CPC .......... B60H 1/00207; B60H 1/00885; B60H 1/00064; B60H 1/005; B60H 1/03; B60H 2001/002; B60H 2001/00928; B60H 2001/00949

USPC ......... 62/133, 134, 175, 236, 239, 241, 244; 165/44, 271
See application file for complete search history.

(56) References Cited

U.S. PATENT DOCUMENTS 2,193,838 A    8/1935   Murphy et al.
2,160,389 A    1/1938   Palmer
(Continued)

FOREIGN PATENT DOCUMENTS

DE         3704182      8/1988
DE     196 09 048.2     9/1997
(Continued)

OTHER PUBLICATIONS

Final Office Action dated Nov. 20, 2008 (U.S. Appl. No. 10/780,119).
(Continued)

*Primary Examiner* — Marc Norman
*Assistant Examiner* — Paolo Gonzalez
(74) *Attorney, Agent, or Firm* — Fitch, Even, Tabin & Flannery, LLP

(57) ABSTRACT

The invention relates to a heating and air-conditioning system (10) for a motor vehicle, in particular a utility vehicle, in order to heat or cool the inside of a motor vehicle during a journey and when the motor vehicle is stationary. The inside of the motor vehicle is divided into a front region and a back region, which can be heated and cooled separately, and comprises a front system (12) which is used to heat and cool the front region during a journey of the motor vehicle, a rear system (14) which is used to heat and cool the rear region during a journey of the motor vehicle and a stationary system (16) which is used to heat and to cool at least the rear region when the motor vehicle is stationary. According to the invention, the stationary system is integrated into the rear system. The invention further relates to a method for heating and air-conditioning a motor vehicle by means of a heating and air-conditioning system (10).

6 Claims, 12 Drawing Sheets

(52) U.S. Cl.
CPC ............ *B60H1/00885* (2013.01); *B60H 1/03* (2013.01); *B60H 2001/002* (2013.01); *B60H 2001/00928* (2013.01); *B60H 2001/00949* (2013.01)

(56) References Cited

U.S. PATENT DOCUMENTS

| | | | |
|---|---|---|---|
| 2,185,515 | A | 7/1939 | Neeson |
| 2,513,679 | A | 7/1950 | Ritter |
| 2,875,595 | A | 5/1954 | Kleist |
| 3,621,930 | A | 11/1971 | Dutchak |
| 3,866,433 | A | 2/1975 | Krug |
| 3,885,398 | A | 5/1975 | Dawkins |
| 4,015,962 | A | 4/1977 | Tompkins |
| 4,141,425 | A | 2/1979 | Treat |
| 4,209,993 | A | 7/1980 | Rannenberg |
| 4,237,384 | A | 12/1980 | Kennon |
| 4,350,900 | A | 9/1982 | Baughman |
| 4,401,013 | A | 8/1983 | Ohashi et al. |
| 4,537,047 | A | 8/1985 | Seshadri et al. |
| 4,632,205 | A | 12/1986 | Lewis |
| 4,637,222 | A | 1/1987 | Fujiwara et al. |
| 4,720,980 | A | 1/1988 | Howland |
| 4,762,170 | A | 8/1988 | Nijjar et al. |
| 4,935,639 | A | 6/1990 | Yeh |
| 4,957,657 | A | 9/1990 | Stil et al. |
| 5,056,330 | A | 10/1991 | Isobe et al. |
| 5,205,130 | A | 4/1993 | Pannell |
| 5,265,437 | A | 11/1993 | Saperstein |
| 5,277,038 | A | 1/1994 | Carr |
| 5,287,004 | A | 2/1994 | Finley |
| 5,333,678 | A | 8/1994 | Mellum et al. |
| 5,553,662 | A | 9/1996 | Longardner et al. |
| 5,560,214 | A | 10/1996 | Burk |
| 5,735,133 | A | 4/1998 | Voss |
| 5,752,655 | A | 5/1998 | Kodama |
| 5,920,127 | A | 7/1999 | Damron et al. |
| 5,934,092 | A | 8/1999 | Krompass |
| 5,957,193 | A | 9/1999 | Kanada |
| 6,059,016 | A | 5/2000 | Rafalovich |
| 6,094,926 | A | 8/2000 | Nakayama et al. |
| 6,260,376 | B1 | 7/2001 | Khelifa |
| 6,365,985 | B1 | 4/2002 | Cohen |
| 6,460,356 | B1 * | 10/2002 | Tao et al. ........................ 62/175 |
| 6,525,505 | B2 | 2/2003 | Bay |
| 6,543,240 | B2 | 4/2003 | Grafton |
| 6,932,148 | B1 * | 8/2005 | Brummett et al. ............. 165/43 |
| 7,043,931 | B2 * | 5/2006 | Plummer ........................ 62/236 |
| 2001/0011825 | A1 | 8/2001 | de Vega |
| 2001/0015070 | A1 | 8/2001 | Hara |
| 2002/0100290 | A1 * | 8/2002 | Herta et al. .................... 62/434 |
| 2003/0014992 | A1 | 1/2003 | Grafton |
| 2003/0015945 | A1 | 1/2003 | Vandenbussche |
| 2003/0033825 | A1 | 2/2003 | Goosman |
| 2003/0192952 | A1 * | 10/2003 | Horn et al. ..................... 236/10 |
| 2004/0060312 | A1 | 4/2004 | Horn et al. |
| 2004/0123976 | A1 | 7/2004 | Horn |
| 2005/0087333 | A1 * | 4/2005 | Horn et al. ................... 165/203 |
| 2005/0178537 | A1 * | 8/2005 | Horn et al. ................... 165/202 |
| 2006/0130505 | A1 * | 6/2006 | Plummer ........................ 62/236 |
| 2007/0044951 | A1 * | 3/2007 | Horn et al. ................... 165/203 |
| 2007/0083295 | A1 | 4/2007 | Khelifa et al. |
| 2007/0125514 | A1 * | 6/2007 | Horn et al. ..................... 165/42 |
| 2007/0175230 | A1 * | 8/2007 | Plummer et al. .............. 62/236 |
| 2008/0173029 | A1 * | 7/2008 | Kraemer et al. ................. 62/89 |

FOREIGN PATENT DOCUMENTS

| | | | |
|---|---|---|---|
| DE | 19645178 | | 5/1998 |
| DE | 19645178 | A1 | 5/1998 |
| DE | 19852641 | | 8/1999 |
| DE | 19860057 | | 7/2000 |
| DE | 19860057 | A1 | 7/2000 |
| DE | 19927518 | | 1/2001 |
| DE | 10156310 | | 11/2002 |
| DE | 10156310 | C1 | 11/2002 |
| DE | 19948943 | C2 | 11/2002 |
| DE | 10233415 | A1 * | 2/2004 |
| DE | 10242464 | A1 * | 3/2004 |
| JP | 5340636 | | 12/1993 |
| JP | 2001161721 | | 6/2000 |
| JP | 2000205777 | | 7/2000 |
| JP | 2003211950 | | 7/2003 |
| WO | WO 98/15420 | | 4/1998 |
| WO | WO/99/61269 | | 12/1999 |
| WO | WO 0000361 | * | 1/2000 |
| WO | WO 00/29231 | | 5/2000 |
| WO | WO 0068031 | A1 * | 11/2000 |
| WO | WO 0140005 | | 6/2001 |
| WO | WO 02/090848 | A1 | 11/2002 |
| WO | WO 03031884 | A2 * | 4/2003 |
| WO | WO 2004/000588 | A1 | 12/2003 |

OTHER PUBLICATIONS

Final Office Action dated Jul. 11, 2008 (U.S. Appl. No. 10/780,119).
Non-final Office Action dated Aug. 23, 2007 (U.S. Appl. No. 10/780,119).
Final Office Action dated Aug. 25, 2006 (U.S. Appl. No. 10/780,119).
Non-final Office Action dated Jan. 25, 2006 (U.S. Appl. No. 10/780,119).
Specification and drawings filed Feb. 17, 2004 (U.S. Appl. No. 10/780,119).

* cited by examiner

HEATING AND AIR-CONDITIONING SYSTEM FOR A MOTOR VEHICLE

CROSS-REFERENCE TO RELATED APPLICATIONS

This application is a 35 U.S.C. §371 National Stage entry of PCT/EP2005/003973, filed Apr. 15, 2005, which claims priority from German Patent Application No. 102004019 607.9, filed Apr. 22, 2004, the contents of which are herein incorporated by reference to the extent allowed by law.

BACKGROUND OF THE INVENTION

Field of the Invention

The invention relates to a heating and air-conditioning system for a motor vehicle, in particular a utility vehicle, in order to heat and cool the inside of a motor vehicle during a running-state and a stop-state of the motor vehicle, wherein the inside of the motor vehicle is divided into a front region and a rear region, which can be heated and cooled separately. The heating and air-conditioning system comprises a front system for heating and cooling the front region during the running-state of the motor vehicle, a rear system for heating and cooling the rear region during the running-state of the motor vehicle and a stop-state system which is used to heat and cool at least the rear region when the motor vehicle is in the stop-state.

The invention further relates to a method for heating and air-conditioning a motor vehicle.

Furthermore, the invention relates to a motor vehicle having a heating and air-conditioning system.

BRIEF SUMMARY OF THE INVENTION

In utility vehicles, in particular in trucks, specific requirements are made on heating and cooling, that is, generally speaking, air-conditioning the inside of the vehicle. The inside of the vehicle is generally divided into a front region and a rear region, wherein the front region includes driver and co-driver seats, which are occupied during the running-state of the vehicle, and wherein the rear region comprises a sleeper-cab which is used when the vehicle is in the stop-state. In order to provide the driver during rest, which he spends within the sleeper-cab, with a comfortable climate, it is helpful to be able to heat and cool the rear region as needed, when the vehicle is in the stop-state.

For this purpose, state of the art concepts propose to combine the front system with the rear system, and, in particular, to drive a common compressor of the air-conditioning system also when the vehicle is in the stop-state, in order to cool the rear region of the vehicle. Disadvantages of this concept are high fuel consumption, wear and tear of the engine when the vehicle is in the stop-state, and additional emissions such as pollutants and noise due to the operation of the engine.

These disadvantages had been confronted in part by allowing the operation of the front system and the rear system exclusively during the running-state of the vehicle and by providing an additional self-sufficient stop-state air-conditioning system. The stop-state system operates with, for example, an electrically or mechanically driveable compressor which is supplied with power by an auxiliary motor or an auxiliary battery. Even if this concept lowers fuel consumption, it causes decreased engine wear and results in fewer emissions, it has the drawback that due to the self-sufficient stop-state air-conditioning system extensive complexity is required.

Within the scope of the present disclosure, operating states of the motor vehicle are indicated by the terms "running-state" and "stop-state". In this context, it should be borne in mind that "running-state" indicates operating states that do not necessarily require the vehicle to be in transit or motion. On the contrary, it is sufficient that the power supplying aggregate, that is generally the engine of the vehicle, is running.

The present invention provides a heating and air-conditioning system having a very rational arrangement.

This objective is solved with the features of the independent claims.

Advantageous implementation formats of the invention are defined in the dependent claims.

The invention is established beyond the generic heating and air-conditioning system in that the stop-state system is integrated into the rear system. Thus, the overall arrangement of the system is more rational since the stop-state system and the rear system may present common components.

In particular, it is intended that the stop-state system comprises a cooling heat exchanger and a cold accumulator, and in so doing that the cooling heat exchanger, a heating heat exchanger of the rear system, and an evaporator of the rear system are supplied with an air flow by the same blower. The cold accumulator of the stop-state system is charged by an evaporation process in the region of the cold accumulator during the running-state of the motor vehicle. The integration of the stop-state system into the rear system is realizable in this case by supplying a cooling heat exchanger which communicates with the cold accumulator with air from the same blower as the evaporator and the heating heat exchanger of the rear system.

With this solution, it is further especially beneficial that the cooling heat exchanger of the stop-state system and the cold accumulator of the stop-state system are arranged in a heat carrier circuit, through which a heat carrier is conveyed by a pump. The heat carrier medium can thus withdraw cold stored in the cold accumulator and transport the cool heat carrier medium to the cooling heat exchanger through power of an electrically driven pump. There, air coming from the blower acts upon the cool heat carrier medium, which is then enabled to flow into the rear region of the vehicle as cooled air.

Further, it is especially beneficial that an evaporator of the front system, an evaporator of the rear system, and a cold accumulator of the stop-state system communicate with the same condenser and that a compressor is provided for the entire heating and air-conditioning system. It is thus sufficient to provide a single condenser and a single compressor for operating the entire system. The cooling agent that is liquidized within the condenserican reach the evaporator of the front system, the evaporator of the rear system and the cold accumulator of the stop-state system in a valve controlled manner. From these components, the cooling agent is returned to the solitary compressor of the arrangement.

However, it is also possible that an evaporator of the front system and an evaporator of the rear system communicate with the same condenser and that the stop-state system comprises its own condenser and its own compressor. By doing so, the adaptive complexity compared to the implementation format having only a single compressor and only a single condenser is increased, but there is, however, a benefit in flexibility when integrating the stop-state air-conditioning system. By equipping the stop-state air-conditioning system with a separate condenser and a separate compressor, it is possible to fill the stop-state air-conditioning system separately with cooling agent and add it to the entire system.

Further, it can be set up such that an evaporator of the rear system and a cold accumulator of the stop-state system communicate with the same condenser and that the front system comprises its own condenser and its own compressor. By doing so, the front system is decoupled from the combined rear stop-state air-conditioning system. The load of the front system is thereby reduced, no long cooling agent conduits are necessary between the front region and the rear region, and the rear stop-state air-conditioning system can be integrated in a flexible manner without considering the front system. The compressor of the combined rear stop-state system can be driven mechanically or electrically. In the stop-state of the motor vehicle generally no operation of the compressor is required, since the cold accumulator provides the necessary cold for the stop-state air-conditioning.

However, it may be beneficial that the rear system and the stop-state system comprise a common compressor which is operable in the stop-state. In this implementation format a cold accumulator is dispensable. In the stop-state, the compressor is operable mechanically or electrically. The power required for this can, for example, is derived from a sufficiently charged auxiliary battery or a fuel cell.

The invention is, moreover, beneficially further developed in that the stop-state system comprises a cold accumulator and in that the stop-state system and the rear system comprise a common cooling heat exchanger which is communicating with the cold accumulator via a pump. By this means a separate evaporator for the running-state air-conditioning assigned to the rear system is dispensable. Rather than having air-conditioning of the rear region be conducted during the running-state by interposition of the cold accumulator.

Furthermore, it may be set up such that that the stop-state system and the rear system comprise a common accumulator-evaporator-heat-exchanger-unit. The cold accumulator thus serves for storing cold, as a heat exchanger supplied with air from the blower during the stop-state and as a heat exchanger supplied with air from the blower during the running-state.

The invention further concerns a method for heating and air-conditioning of a motor vehicle with the heating and air-conditioning system according to the present invention, and a motor vehicle with the heating and air-conditioning system according to the present invention. By this means, the advantages and special features of the heating and air-conditioning system according to the present invention are also implemented within the scope of a method and a motor vehicle.

The invention is based on the conclusion that, due to integration of the stop-state system into the rear system, additional possibilities for rationalization with regard to the overall system can be accomplished. Furthermore, this integration provides the prerequisite for lowering energy consumption and emissions as well as for reducing wear and tear of the components that are involved in comparison with systems with the present state of technology.

The invention is now to be explained in an exemplary fashion by referring to the accompanying drawings of specifically selected implementation formats. In so doing, there are shown:

DETAILED DESCRIPTION OF THE INVENTION

Figure 1:
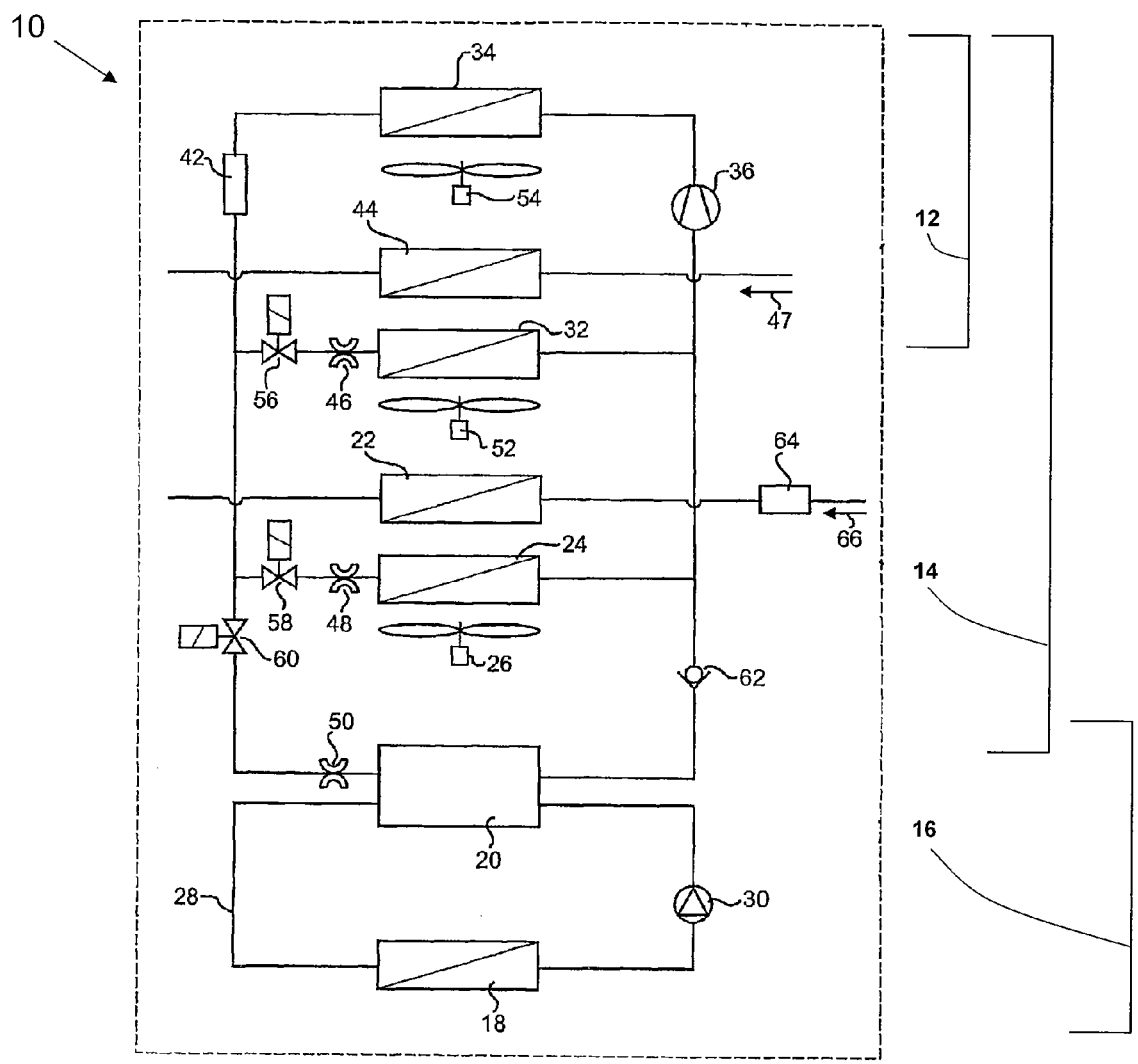
FIG. 1 a schematic diagram of a first implementation format of a heating and air-conditioning system according to the present invention.

In the following detailed description of the preferred implementation format of the present invention, identical reference numerals (modulo 100) identify identical or similar components. It will be understood that those components in FIGS. 3-12 that are similar to components described in FIG. 1 are numbered the same except for the Figure number placed in front of the reference number. Thus, for example, common condenser 334 in FIGS. 3 and 434 in FIG. 4 both refer to a condenser similar and analogous to common condenser 34 in FIG. 1.

Figure 2:
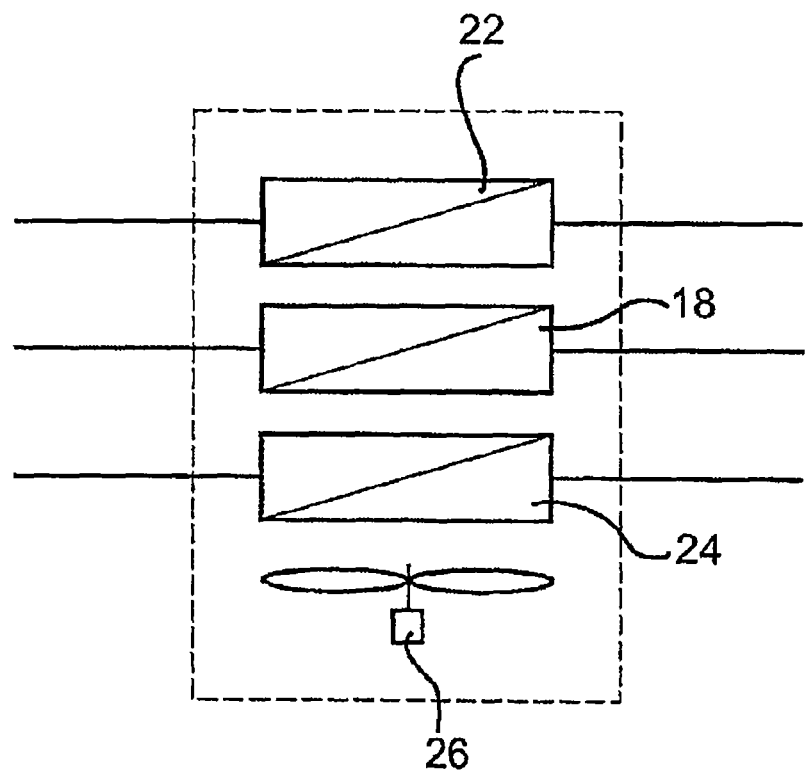
FIG. 2 an explanatory illustration of possible geometric arrangements of components of a heating and air-conditioning system according to the present invention.

FIG. 1 shows a schematic diagram of a first implementation format of a heating and air-conditioning system according to the present invention. FIG. 2 shows two explanatory illustrations of possible geometric arrangements of components of the heating and air-conditioning system according to the present invention. The heating and air-conditioning system 10 comprises a front system 12, a rear system 14 and a stop-state system 16, wherein the mentioned systems are combined with each other. This shows in particular in that a common compressor 36, a common condenser 34 and a common accumulator 42 communicate with the evaporator 32 of the front system 12, the evaporator 24 of the rear system 14 and the cold accumulator 20 of the stop-state system 16, and in that an air flow of the same blower 26 acts upon the heating heat exchanger 22 of the rear system 14, the cooling heat exchanger 18 of the stop-state system 16 and the evaporator 24 of the rear system 14 which acts as a cooling heat exchanger of the rear system 14, as shown in FIG. 2. Besides the already mentioned components, the heating and air-conditioning system 10 comprises, a heating heat exchanger 44 for the front system 12, which can be supplied with cooling water 47, an expansion element 46 assigned to an evaporator 32 of the front system 12, an expansion element 48 assigned to the evaporator 24 of the rear system 14 and an expansion element 50 assigned to a cold accumulator 20. Besides the already mentioned blower 26, an additional blower 52 is provided which is able to supply an air flow to the evaporator 32 of the front system 12 and the heating heat exchanger 44 of the front system 12. Further, a blower 54 is provided for supplying the condenser 34 with an air flow. Moreover, electrically operable magnetic valves 56, 58, 60 are provided. In an opened state of the magnetic valves 56, the evaporator 32 of the front system 12 is supplied with cooling agent, whereas this is prohibited in a closed state of the magnetic valve 56. In an opened state of the magnetic valve 58, the evaporator 24 of the rear system 14 is supplied with cooling agent, whereas this is prohibited in a closed state of the magnetic valve 58. In an opened state of the magnetic valve 60, the cold accumulator 20 is supplied with cooling agent, whereas this is prohibited in a closed state of the magnetic valve 60. Further, a check valve 62 is provided which prevents reverse flow of cooling agent in the direction towards the cold accumulator 20. The cold accumulator 20 and the cooling heat exchanger 18 are connected with each other via a heat carrier circuit 28, wherein a pump 30 for conveying a heat carrier medium through the components is provided. Further, a water heater 64 is provided which is able to heat cooling water 66 streaming into the heating heat exchanger 22 of the rear system 14, in order to enable a stop-state heating operation.

In the running-state, the compressor 36 is driven by the engine of the motor vehicle such that the condenser 34 is supplied with compressed cooling agent. This is then supplied to the evaporator 32, 24 of the front system 12 and the rear system 14 and to the cold accumulator 20 via the accumulator 42 dependent on the state of the magnetic valves 56, 58, 60. In particular, the cold accumulator 20 can be charged in this manner with the magnetic valve 60 being opened. In the stop-state of the vehicle, that is when the engine is at rest, the cooling energy can then be withdrawn from the cold accumulator 20 by operating the pump 30. This cooling energy can be fed to the rear region of the vehicle in form of a cooled air flow via the cooling heat exchanger 18 through an air flow 26 acting upon the same (see FIG. 2).

Figure 3:
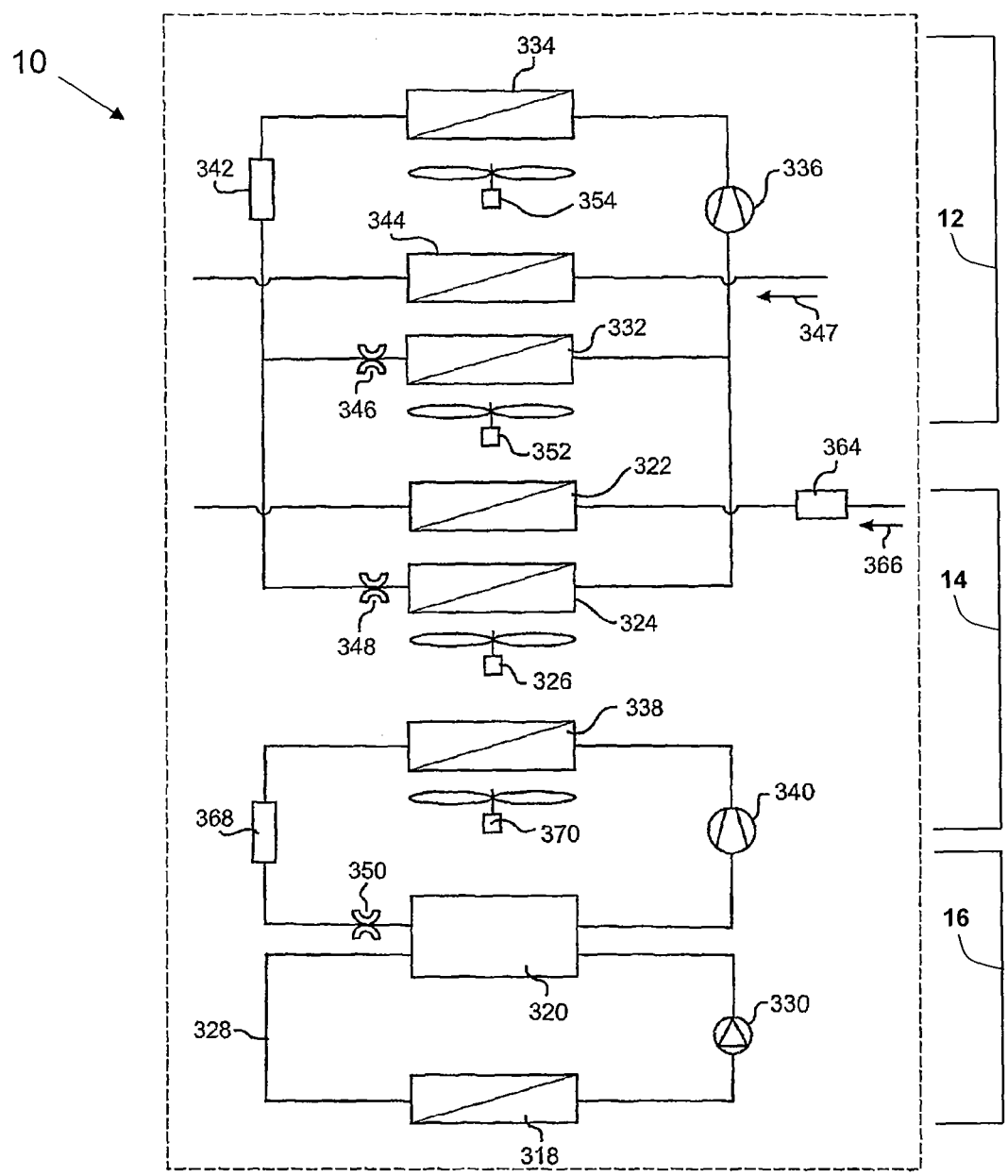
FIG. 3 a schematic diagram of a second implementation format of a heating and air-conditioning system according to the present invention.

FIG. 3 shows a schematic diagram of a second implementation format of a heating and air-conditioning system according to the present invention. In this implementation format of the heating and air-conditioning system 10 according to the present invention, the front system 12 and the rear system 14 are designed in a comparable manner, in particular regarding the operation in the running-state, as the heating and air-conditioning system 10 according to FIG. 1. Merely no valves are provided for enabling a selective operation of the front system 12 and the rear system 14 during the running-state. Of course, this is possible by arranging magnetic valves prior to the expansion elements 346 and 348.

The stop-state system 16 is integrated in a different manner into the heating and air-conditioning system 10 as described in connection with FIG. 1. The stop-state system comprises an additional compressor 340, which is preferably electrically drivable, by, for example, electric power directly from the generator, from a battery, preferably an auxiliary battery, or by electric power from a fuel cell. Compressed cooling agent is fed into an additional condenser 338 that is cooled by an additional blower 370. The compressed cooling agent is then fed to the cold accumulator 320 via an additional accumulator 368 and an expansion element 350. The thus conducted charging process of the cold accumulator 320 is preferably conducted during the running-state of the vehicle, because then sufficient power for operating the compressor 340 is available. However it is also possible to conduct a charging process in the stop-state of the vehicle, if a sufficient amount of electric power is available. The discharging of the cold accumulator 320 is then effected as in the implementation format according to FIG. 1.

In the present implementation format according to FIG. 3, the integration of the stop-state system 16 into the rear system 14 is also characterized in particular in that an air flow from a common blower 326 acts upon the components of the heating heat exchanger 322 of the rear system 14, the cooling heat exchanger 318 of the stop-state system 16 and the evaporator 324 of the rear system 14, as illustrated in connection with FIG. 2.

Figure 4:
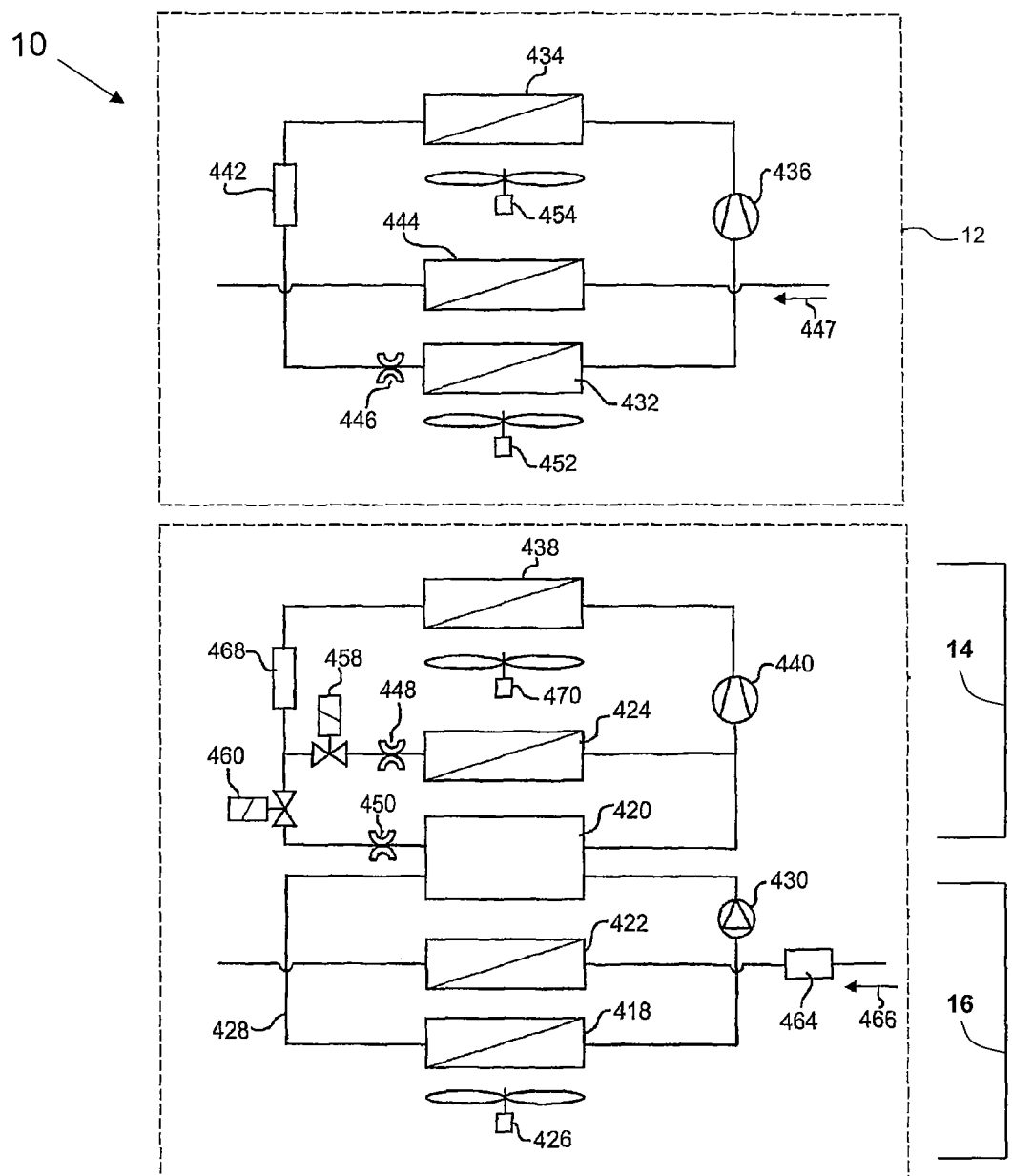
FIG. 4 a schematic diagram of a third implementation format of a heating and air-conditioning system according to the present invention.

FIG. 4 shows a schematic diagram of a third implementation format of a heating and air-conditioning system according to the present invention. In this illustrated implementation format of the heating and air-conditioning system 10, a compressor 436 and a condenser 434 are provided for the operation of the front system 12, and a compressor 440 and a condenser 438 are provided for the operation of the rear system 14 and the operation of the stop-state system 16. The front system 12 and the combination of rear system 14 and stop-state system 16 are thus completely decoupled. The compressor 440 which is in particular electrically driven, operates preferably in the running-state, in order to provide a running-state air-conditioning of the rear region through the evaporator 424 and in order to charge the cold accumulator 420. A discharging is effected again via the heat carrier circuit 428 by operating the pump 430. Again it is to be noted, as already mentioned in connection with FIG. 3, that an operation of the compressor 440 by all means may also be considered during the stop-state. Then, a direct cooling of the rear region via the evaporator 424 with the magnetic valves 458 being opened is possible and/or a charging of the cold accumulator 420 is possible with the magnetic valve 460 being opened, in order to withdraw this cooling energy later on from the cold accumulator 420. Again, as shown in FIG. 2, an air flow from the same blower 426 acts on the heating heat exchanger 422, the cooling heat exchanger 418 and the evaporator 424.

Figure 5:
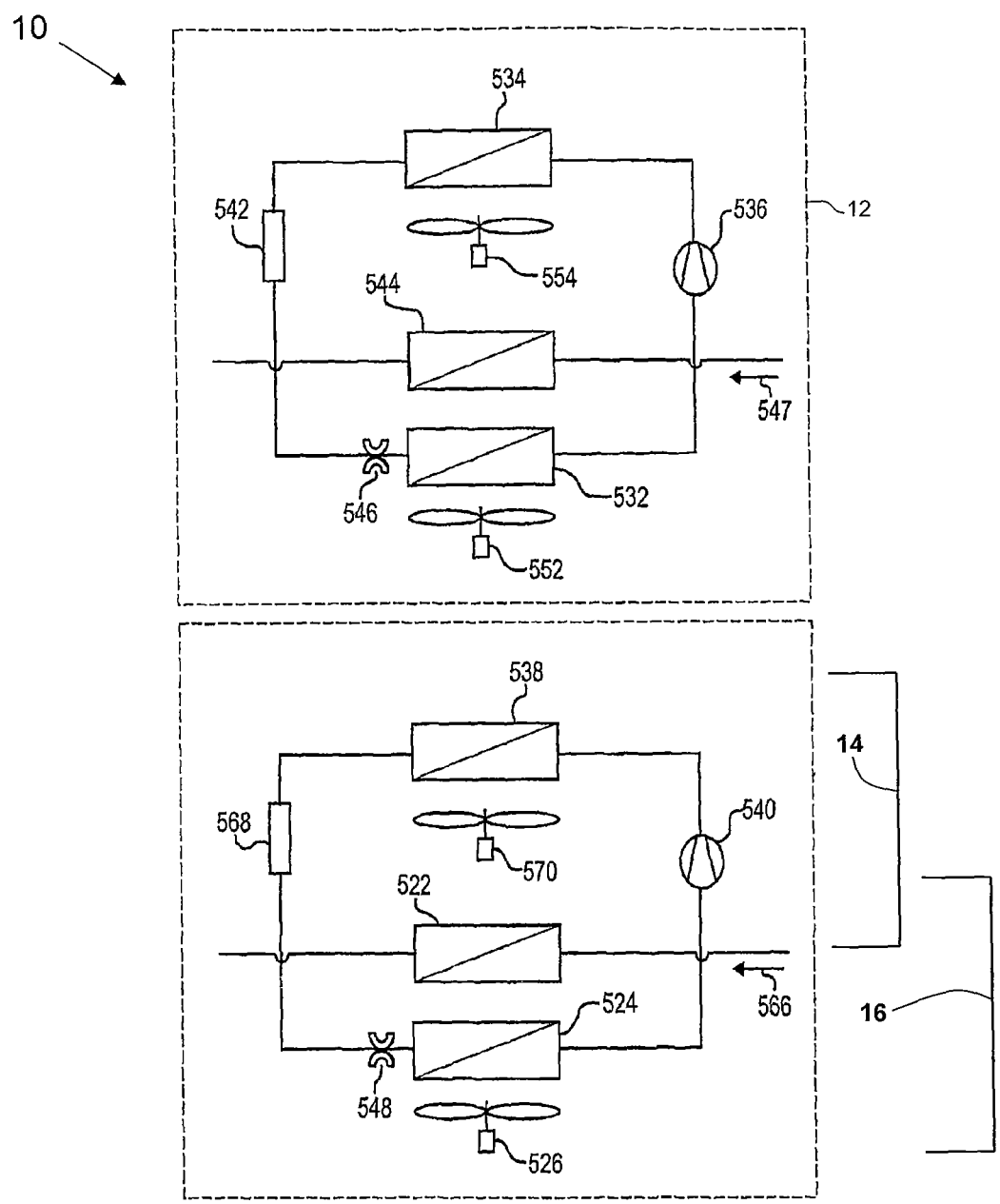
FIG. 5 a schematic diagram of a fourth implementation format of a heating and air-conditioning system according to the present invention.

FIG. 5 shows a schematic diagram of a fourth implementation format of a heating and air-conditioning system according to the present invention. Here, too, a complete decoupling of the front system 12 on the one hand and combination of the rear system 14 and the stop-state system 16 on the other hand is present; The front system 12 corresponds to that of FIG. 5. In contrast to the solution according to FIG. 4, the combination of rear system 14 and stop-state system 16 does not comprise a cold accumulator. Hence, even in the stop-state air-conditioning, the compressor 540 has to be operated in order to be able to generate cold within the evaporator 524. Therefore, it is recommendable to use a compressor that is electrically or mechanically drivable by an auxiliary motor for the compressor 540, because this one can be operated by a battery, in particular an auxiliary battery, or by electric power from a fuel cell during the stop-state of the vehicle. The heating heat exchanger 522 is fed with cooling water 566, so, for example, according to FIG. 4; wherein this can also be achieved for the purpose of heating during the stop-state by a water heater.

Figure 6:
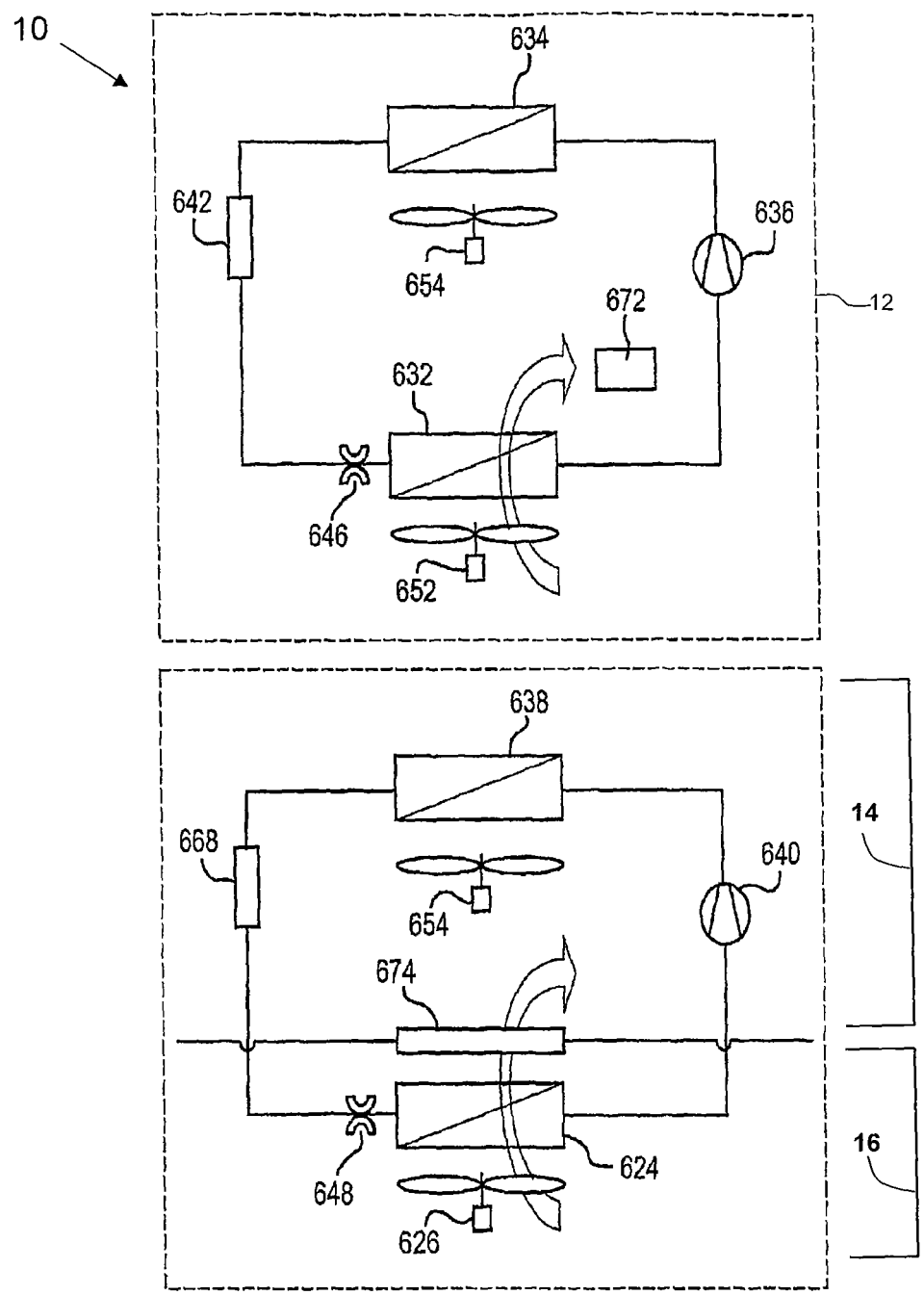
FIG. 6 a schematic diagram of a fifth implementation format of a heating and air-conditioning system according to the present invention.

FIG. 6 shows a schematic diagram of a fifth implementation format of a heating and air-conditioning system according to the present invention. The present example of the heating and air-conditioning system 10 corresponds in a wide extent the one which was described in connection with FIG. 5. Differences can be noted only with respect to the heating means of the front system 12 and the combination of rear system 14 and stop-state system 16. The front system 12 comprises an air heater 672 that is fed with air by the blower 652, preferably by bypassing the evaporator 632.

Such an air heater can be configured as, for example, a conventional fuel-operated auxiliary air heating device. The combination of rear system 14 and stop-state system 16 comprises an electric heater 674. This is fed with electric power from a vehicle battery, in particular an auxiliary battery, a fuel cell or a generator. The electrical heater 674 is also preferably supplied with an air flow by the blower 626 by bypassing the evaporator 624.

Figure 7:
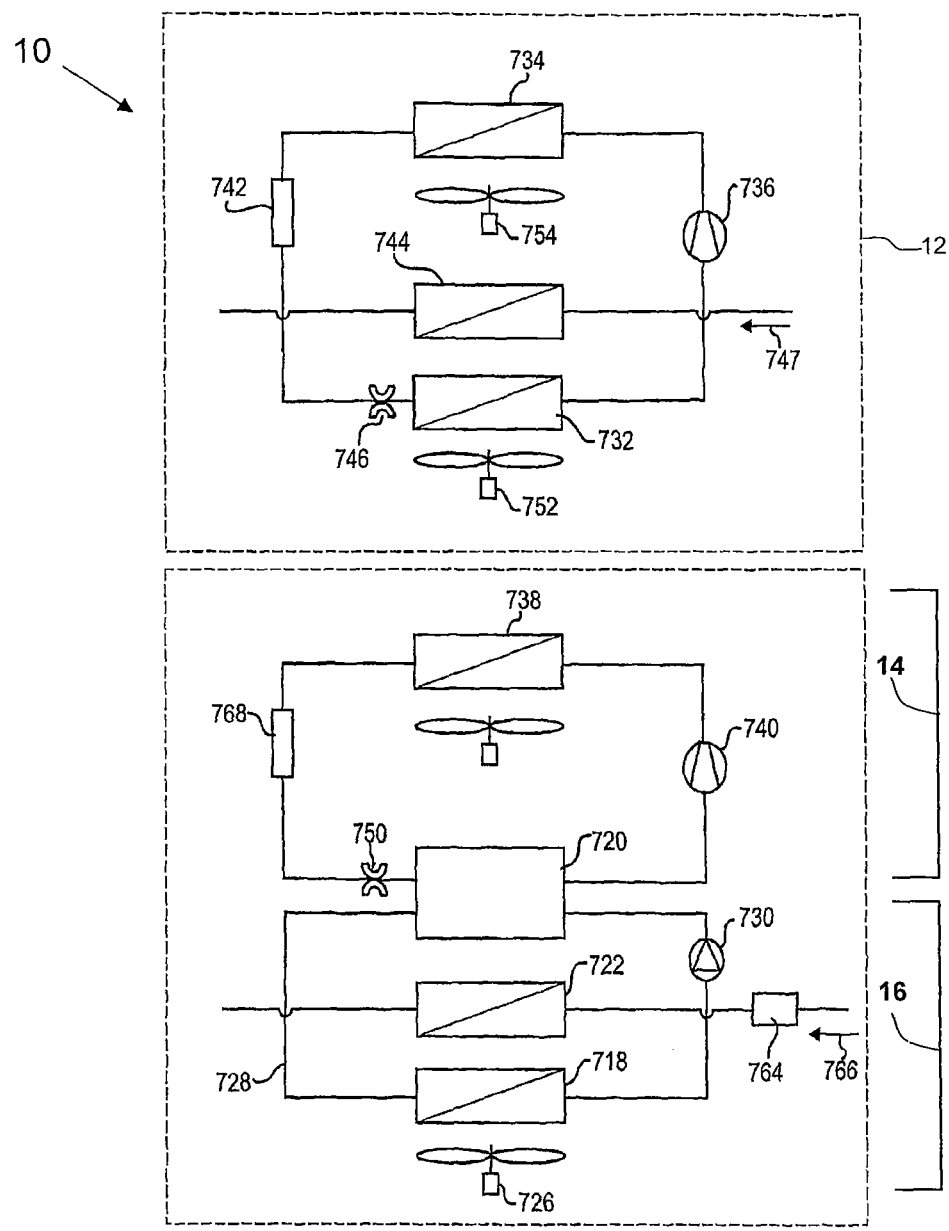
FIG. 7 a schematic diagram of a sixth implementation format of a heating and air-conditioning system according to the present invention.

FIG. 7 shows a schematic diagram of a sixth implementation format of the heating and air-conditioning system according to the present invention. Again, an example is illustrated in which the front system 12 on the one hand and a combination of rear system 14 and stop-state system 16 on the other hand are decoupled completely from each other. The front system 12 is constructed in a conventional manner. In contrast to the implementation format according to FIG. 4, the combination of rear system 14 and stop-state system 16 lacks a separate evaporator. On the contrary, only the cold accumulator 720 is provided as an evaporator of the cooling circuit. Consequently, also in the running-state if a cooling of the rear region of the vehicle is desired, the cold required for cooling is withdrawn from the cold accumulator 720 via the cooling heat exchanger 718 by the pump 730 via the heat carrier circuit 728.

Figure 8:
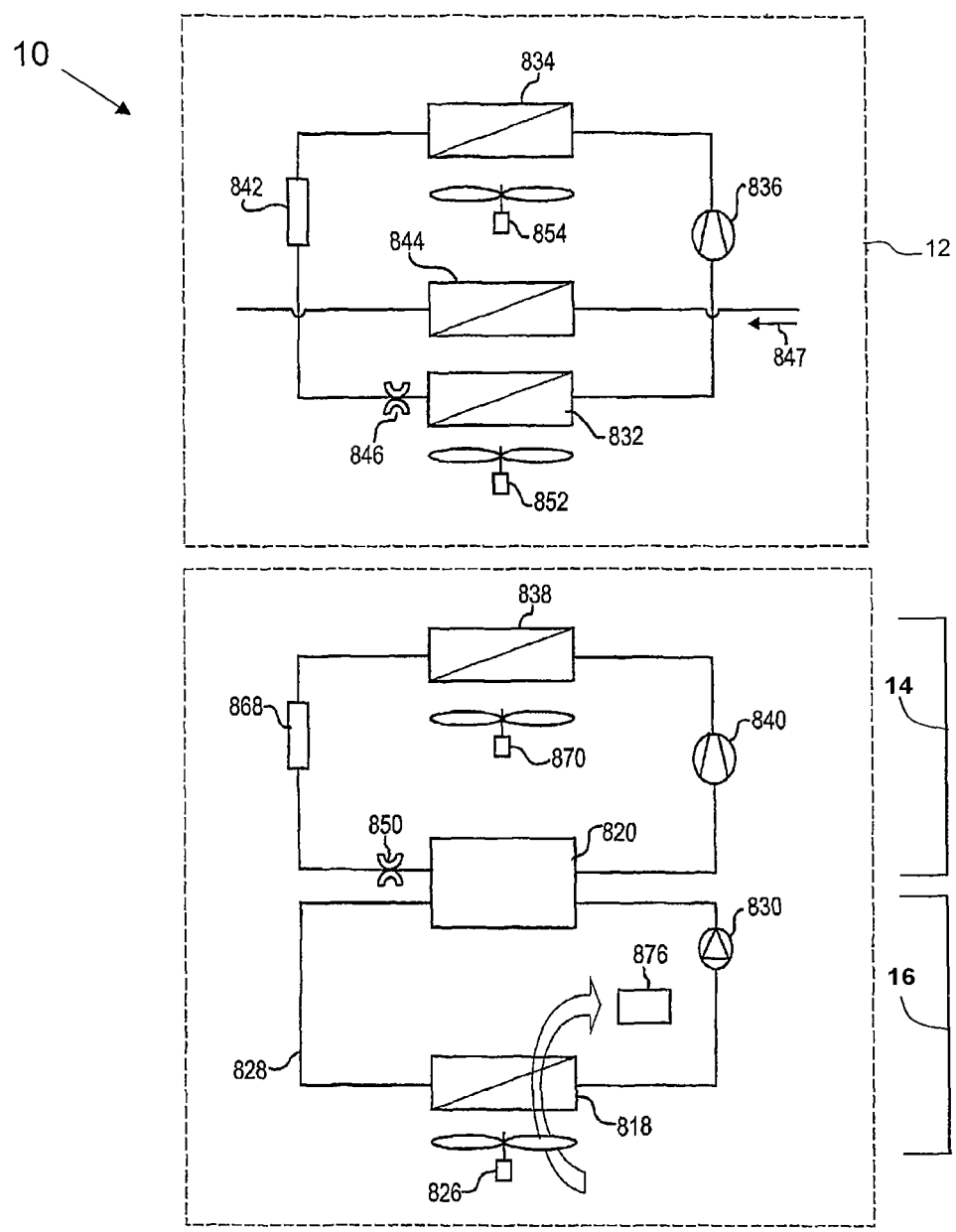
FIG. 8 a schematic diagram of a seventh implementation format of a heating and air-conditioning system according to the present invention.

FIG. 8 shows a schematic diagram of a seventh implementation format of a heating and air-conditioning system according to the present invention. This corresponds in a large extent to the implementation format according to FIG. 7. There are differences with respect to the heater in the combination of the rear system and stop-state system.

In the current example, an air heater 876 is provided which is supplied with air by a blower 826, preferably by bypassing the cooling heat exchanger 818. Such an air heater can be configured as, for example, a conventional fuel-operated auxiliary air heating device.

Figure 9:
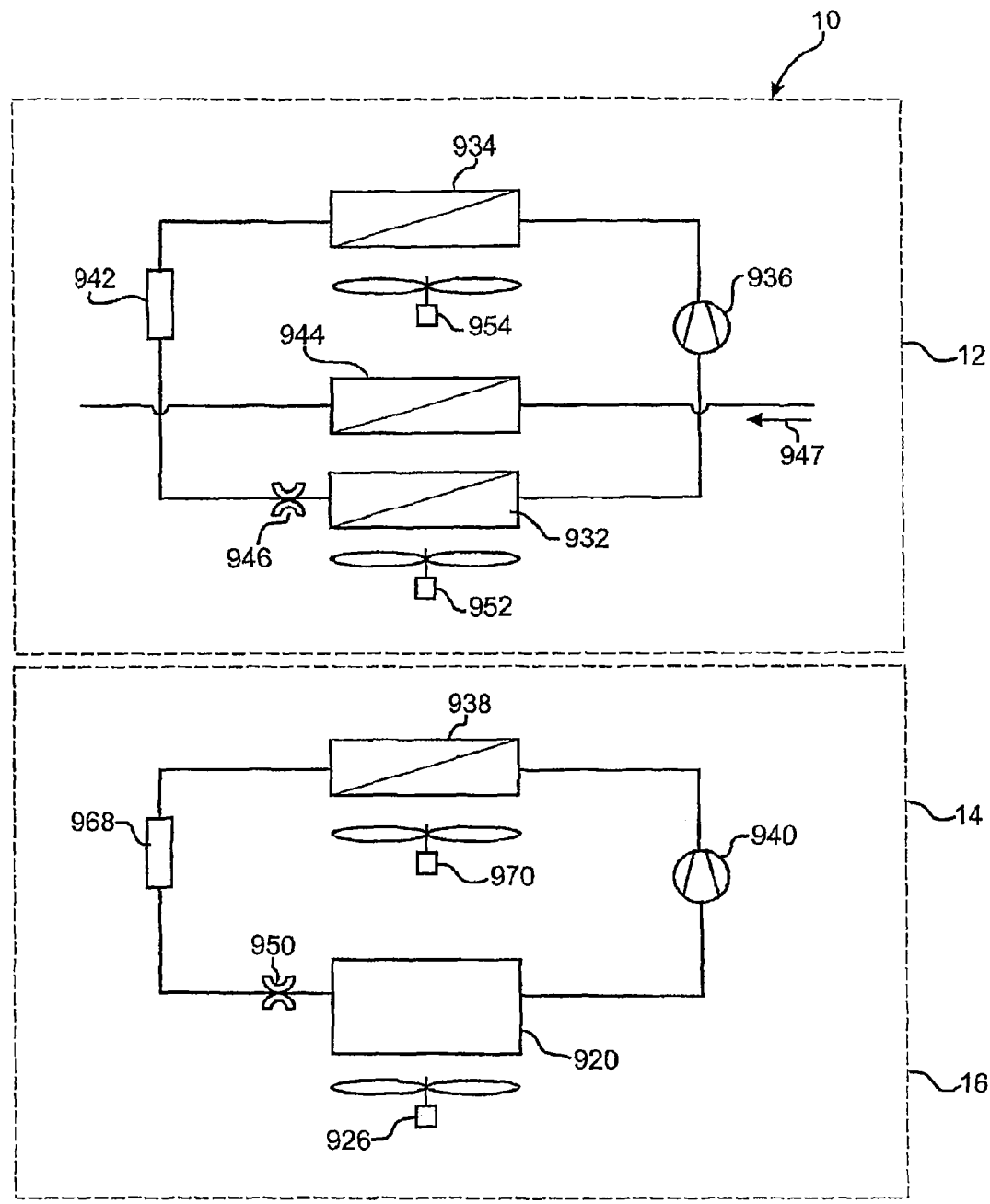
FIG. 9 a schematic diagram of an eight implementation format of a heating and air-conditioning system according to the present invention.

FIG. 9 shows a schematic diagram of an eighth implementation format of a heating and air-conditioning system according to the present invention. The implementation format illustrated here of the heating and air-conditioning system 10 according to the present invention corresponds to a large extent to the implementation format according to FIG. 8. In the combination of rear system 14 and stop-state system 16, however, a separate cooling heat exchanger is omitted. On the contrary, the cold accumulator is designed as an accumulator-evaporator-heat-exchanger-unit 920, which can directly be fed with air by the blower 926 for transmitting cold into the interior of the vehicle. A heating device (not shown) can also be provided by, for example, a heating heat exchanger through which cooling water passes, such as, for example, described in connection with FIG. 7, an air auxiliary heating device, such as, for example, described in connection with FIG. 8, or an electric heater, as for example described in connection with FIG. 6.

Figure 10:
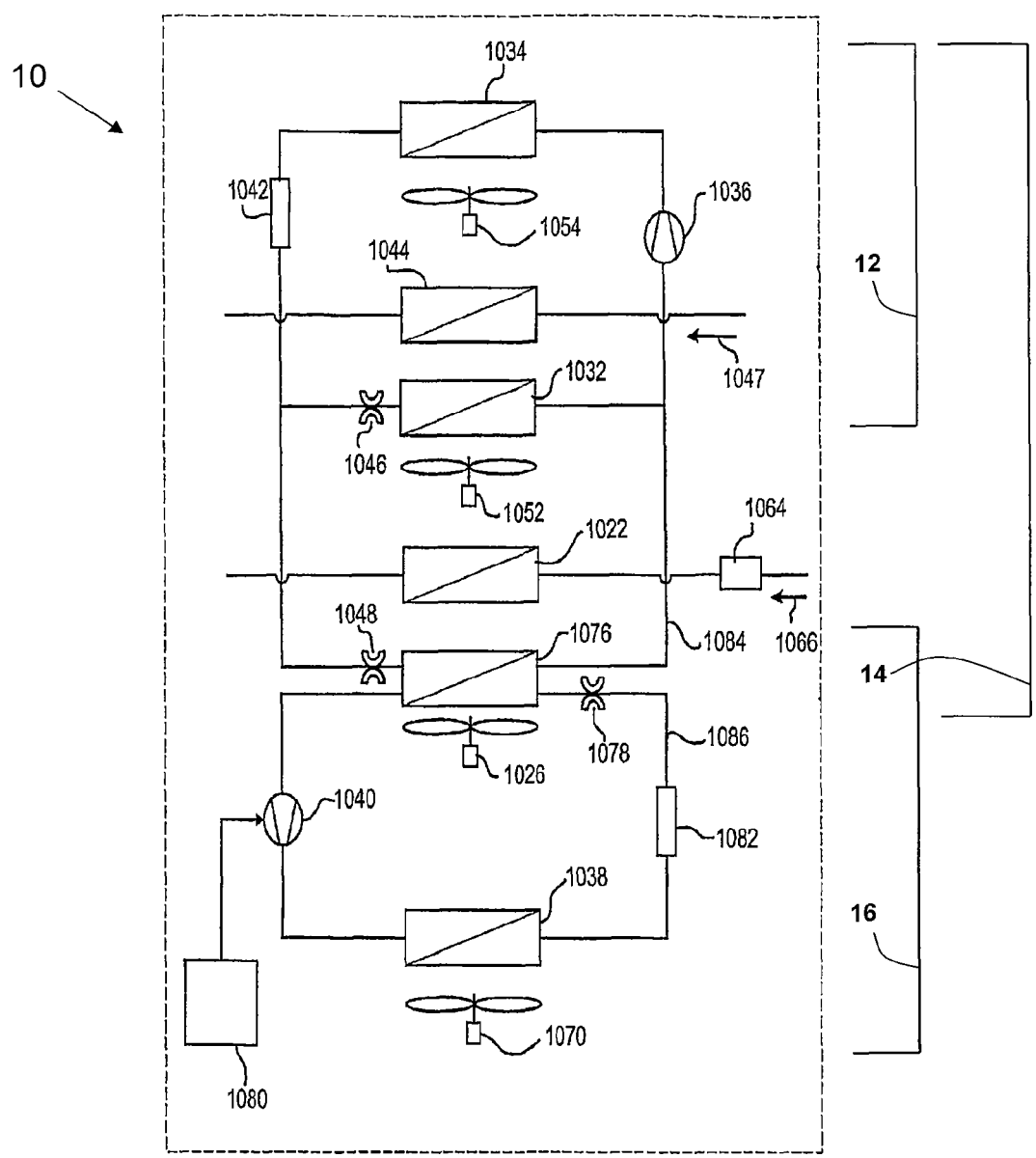
FIG. 10 a schematic diagram of a ninth implementation format of a heating and air-conditioning system according to the present invention.

FIG. 10 shows a schematic diagram of a ninth implementation format of a heating and air-conditioning system according to the present invention. Here, two separate cooling circuits, 1084 and 1086, are provided. Both cooling circuits 1084 and 1086 are connected with the same evaporator 1076, wherein no mixture of the material flowing separately through the evaporator 1076 occurs within the evaporator 1076. The cooling circuit 1086 comprises a compressor 1040 which is drivable by an auxiliary motor 1080 or an auxiliary battery 1080. Operation of the auxiliary motor can be effected as in other implementation formats of the present invention directly mechanically or in that the auxiliary motor directly drives the compressor 1040 via a generator or with interposing a battery that is charged by the generator. The second cooling circuit 1086 is otherwise complete in the sense that it has its own condenser 1038, its own accumulator 1082 and its own expansion element 1078. During the running-state of the vehicle the compressor 1036 is generally operated, whereas the compressor 1040 is not operated. In the stop-state of the motor vehicle, stop-state air-conditioning is conducted due to the compressor 1040 being operated.

Figure 11:
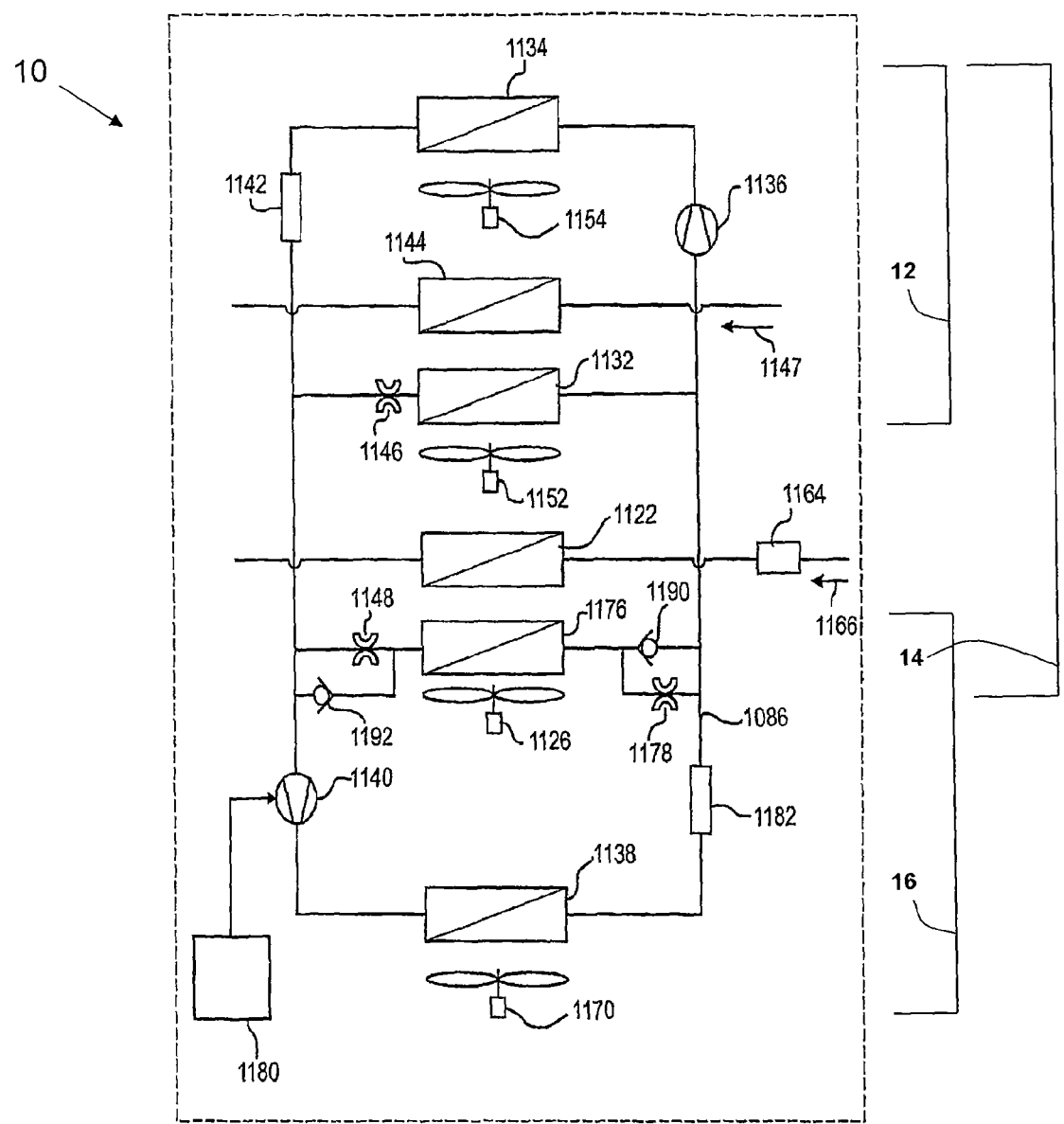
FIG. 11 a schematic diagram of a tenth implementation format of a heating and air-conditioning system according to the present invention.

FIG. 11 shows a schematic diagram of a tenth implementation format of a heating and air-conditioning system according to the present invention. This one corresponds to a large extent with the implementation format according to FIG. 10. In contrast to FIG. 10, no completely separated cooling circuits are provided. The proper operation of the system with the compressor 1136 being operated as well as with the compressor 1140 being operated, is ensured by the arrangement of check valves 1188, 1190, 1192. During operation of the compressor 1036 and during stopping of the compressor 1140, the check valve 1192 ensures that no flow of cooling agent occurs via the conduit which bypasses the expansion element 1148, but that the entire flow proceeds through the expansion element 1148. The compressor 1140 prevents the flow of cooling agent towards the condenser 1138. During stopping of the compressor 1136 and during operating the compressor 1140, the check valve 1190 ensures that the flow through the expansion element 1178 proceeds towards the evaporator 1176. The check valve 1188 ensures that no flow occurs through the evaporator 1132. The compressor 1136 is responsible for avoiding undesired flows of cooling agent occurring in the direction towards the condenser 1134.

Figure 12:
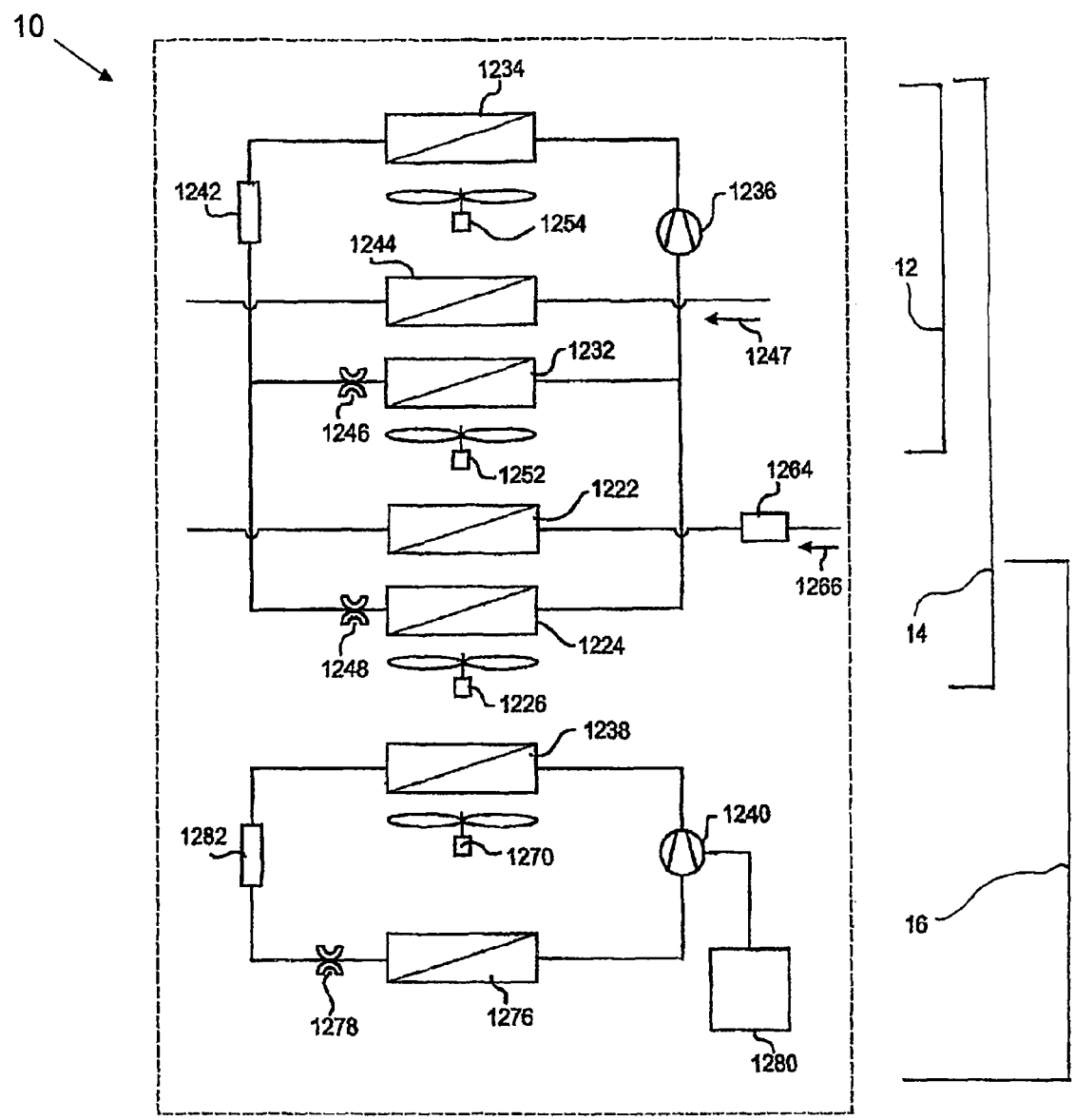
FIG. 12 is a schematic diagram of an eleventh implementation format of a heating and air-conditioning system according to the present invention.

FIG. 12 shows a schematic diagram of an eleventh implementation format of a heating and air-conditioning system according to the present invention. This one corresponds to a large extent with the implementation format according to FIG. 10. In contrast to FIG. 10, however, separate evaporators are provided for the running-state and the stop-state, namely the evaporator 1224 for the running-state and the evaporator 1276 for the stop-state. An integration of the stop-state system 16 into the rear system 14 again shows in particular how the heating heat exchanger 1222 of the rear system 14, the evaporator 1224 of the rear system 14 and the evaporator 1276 of the stop-state system 16 is supplied with an air flow by the same blower 1226, thus comprising, for example, an arrangement, as shown in connection with FIG. 2, that has already been discussed several times. The cooling heat exchanger 18 according to FIG. 2 is then merely replaced by the evaporator 1276 according to FIG. 12.

The features of the present invention disclosed in the preceding description, in the drawings and in the claims can be essential for implementation of the invention individually and in combination.

REFERENCE NUMERALS 10 air-conditioning system
12 front system
14 rear system
16 stop-state system
18 cooling heat exchanger
20 cold accumulator
20 accumulator-evaporator-heat-exchanger-unit
22 heating heat exchanger
24 evaporator
26 blower
28 heat carrier circuit
30 pump
32 evaporator
34 condenser
36 compressor
38 condenser
40 compressor
42 accumulator
44 heating heat exchanger
46 expansion element
47 cooling water
48 expansion element
50 expansion element
52 blower
54 blower
56 magnetic valve
58 magnetic valve
60 magnetic valve
62 check valve
64 water heater
66 cooling water
70 blower
72 air heater
74 heater
76 evaporator
78 expansion element
80 auxiliary motor/auxiliary battery
82 accumulator
84 cooling circuit
86 cooling circuit
88 check valve
90 check valve
92 check valve Reference numerals added with a whole numbered multiple of 100 are indicating identical or similar components.

The invention claimed is:

1. A heating and air-conditioning system for a motor vehicle, in particular a utility vehicle, in order to heat and cool the inside of a motor vehicle during a running-state and a stop-state of the motor vehicle, wherein the inside of the motor vehicle is divided into a front region and a rear region, which can be heated and cooled separately, comprising: a front system for heating and cooling the front region during the running-state of the motor vehicle, a rear system for heating and cooling the rear region during the running-state of the motor vehicle, and a stop-state system for heating and cooling at least the rear region when the motor vehicle is in the stop-state, characterized in that the stop-state system is integrated into the rear system; and characterized in that an evaporator of the front system, an evaporator of the rear system and a cold accumulator of the stop-state system communicate with a same condenser, and a compressor is provided for the entire heating and air-conditioning system.

2. A heating and air-conditioning system for a motor vehicle, in particular a utility vehicle, in order to heat and cool the inside of a motor vehicle during a running-state and a stop-state of the motor vehicle, wherein the inside of the motor vehicle is divided into a front region and a rear region, which can be heated and cooled separately, comprising: a front system for heating and cooling the front region during the running-state of the motor vehicle, a rear system for heating and cooling the rear region during the running-state of the motor vehicle, and a stop-state system for heating and cooling at least the rear region when the motor vehicle is in the stop-state, characterized in that the stop-state system is integrated into the rear system; characterized in that the stop-state system comprises a cooling heat exchanger and a cold accumulator, and the cooling heat exchanger, a heating heat exchanger of the rear system and an evaporator of the rear system are supplied with an air flow by the same blower; and characterized in that an evaporator of the front system, the evaporator of the rear system and the cold accumulator of the stop-state system communicate with a same condenser, and a compressor is provided for the entire heating and air-conditioning system.

3. A heating and air-conditioning system for a motor vehicle, in particular a utility vehicle, in order to heat and cool the inside of a motor vehicle during a running-state and a stop-state of the motor vehicle, wherein the inside of the motor vehicle is divided into a front region and a rear region, which can be heated and cooled separately, comprising: a front system for heating and cooling the front region during the running-state of the motor vehicle, a rear system for heating and cooling the rear region during the running-state of the motor vehicle, and a stop-state system for heating and cooling at least the rear region when the motor vehicle is in the stop-state, characterized in that the stop-state system is integrated into the rear system; characterized in that the stop-state system comprises a cooling heat exchanger and a cold accumulator, and the cooling heat exchanger, a heating heat exchanger of the rear system and an evaporator of the rear system are supplied with an air flow by the same blower; characterized in that the cooling heat exchanger of the stop-state system and the cold accumulator of the stop-state system are arranged in a heat carrier circuit, through which a heat carrier medium is conveyed by a pump; and characterized in that an evaporator of the front system, the evaporator of the rear system and the cold accumulator of the stop-state system communicate with a same condenser, and a compressor is provided for the entire heating and air-conditioning system.

4. A heating and air-conditioning system for a motor vehicle, in particular a utility vehicle, in order to heat and cool the inside of a motor vehicle during a running-state and a stop-state of the motor vehicle, wherein the inside of the motor vehicle is divided into a front region and a rear region, which can be heated and cooled separately, comprising: a front system for heating and cooling the front region during the running-state of the motor vehicle, a rear system for heating and cooling the rear region during the running-state of the motor vehicle, and a stop-state system for heating and cooling at least the rear region when the motor vehicle is in the stop-state, characterized in that the stop-state system is integrated into the rear system; and characterized in that an evaporator of the front system and an evaporator of the rear system communicate with a same condenser, and the stop-state system comprises its own condenser and its own compressor.

5. A heating and air-conditioning system for a motor vehicle, in particular a utility vehicle, in order to heat and cool the inside of a motor vehicle during a running-state and a stop-state of the motor vehicle, wherein the inside of the motor vehicle is divided into a front region and a rear region, which can be heated and cooled separately, comprising: a front system for heating and cooling the front region during the running-state of the motor vehicle, a rear system for heating and cooling the rear region during the running-state of the motor vehicle, and a stop-state system for heating and cooling at least the rear region when the motor vehicle is in the stop-state, characterized in that the stop-state system is integrated into the rear system; characterized in that the stop-state system comprises a cooling heat exchanger and a cold accumulator, and the cooling heat exchanger, a heating heat exchanger of the rear system and an evaporator of the rear system are supplied with an air flow by the same blower; and characterized in that an evaporator of the front system and the evaporator of the rear system communicate with a same condenser, and the stop-state system comprises its own condenser and its own compressor.

6. A heating and air-conditioning system for a motor vehicle, in particular a utility vehicle, in order to heat and cool the inside of a motor vehicle during a running-state and a stop-state of the motor vehicle, wherein the inside of the motor vehicle is divided into a front region and a rear region, which can be heated and cooled separately, comprising: a front system for heating and cooling the front region during the running-state of the motor vehicle, a rear system for heating and cooling the rear region during the running-state of the motor vehicle, and a stop-state system for heating and cooling at least the rear region when the motor vehicle is in the stop-state, characterized in that the stop-state system is integrated into the rear system; characterized in that the stop-state system comprises a cooling heat exchanger and a cold accumulator, and the cooling heat exchanger, a heating heat exchanger of the rear system and an evaporator of the rear system are supplied with an air flow by the same blower; characterized in that the cooling heat exchanger of the stop-state system and the cold accumulator of the stop-state system are arranged in a heat carrier circuit, through which a heat carrier medium is conveyed by a pump; and characterized in that an evaporator of the front system and the evaporator of the rear system communicate with a same condenser, and the stop-state system comprises its own condenser and its own compressor.

* * * * *